Aug. 14, 1956  R. F. MALLINA  2,759,166
WRAPPED ELECTRICAL CONNECTION
Filed June 20, 1952  6 Sheets-Sheet 1
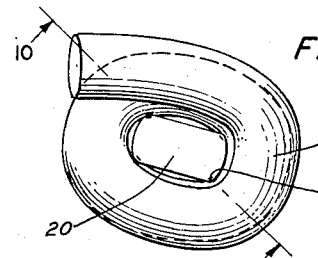
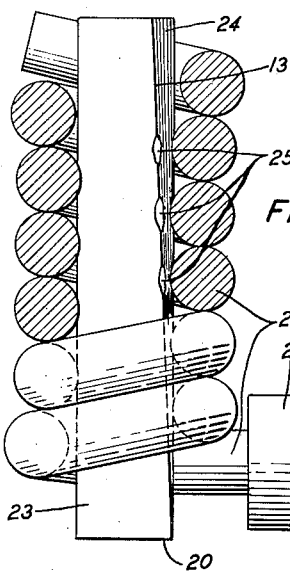
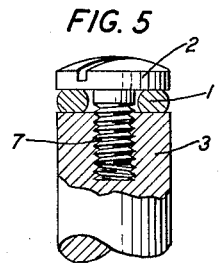
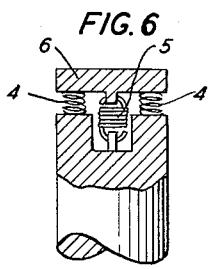
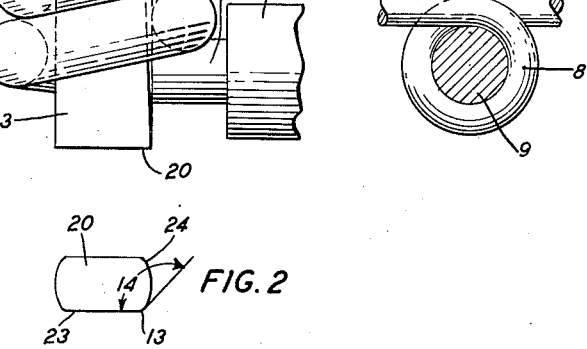
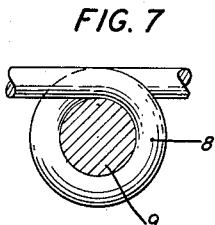
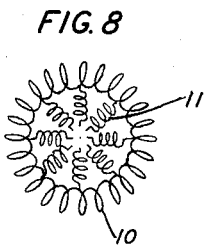
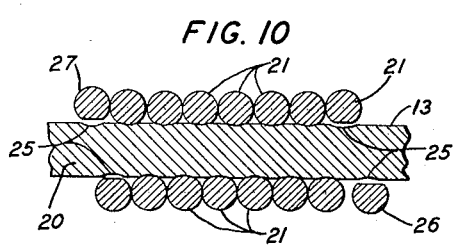
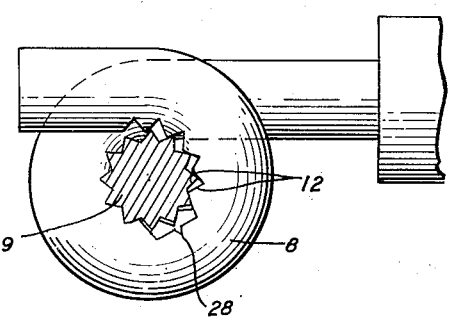
INVENTOR
R. F. MALLINA
BY
ATTORNEY Aug. 14, 1956   R. F. MALLINA   2,759,166
WRAPPED ELECTRICAL CONNECTION
Filed June 20, 1952   6 Sheets-Sheet 2

INVENTOR
R. F. MALLINA
BY
ATTORNEY

Aug. 14, 1956

R. F. MALLINA 2,759,166

WRAPPED ELECTRICAL CONNECTION

Filed June 20, 1952

INVENTOR
R. F. MALLINA
BY
ATTORNEY

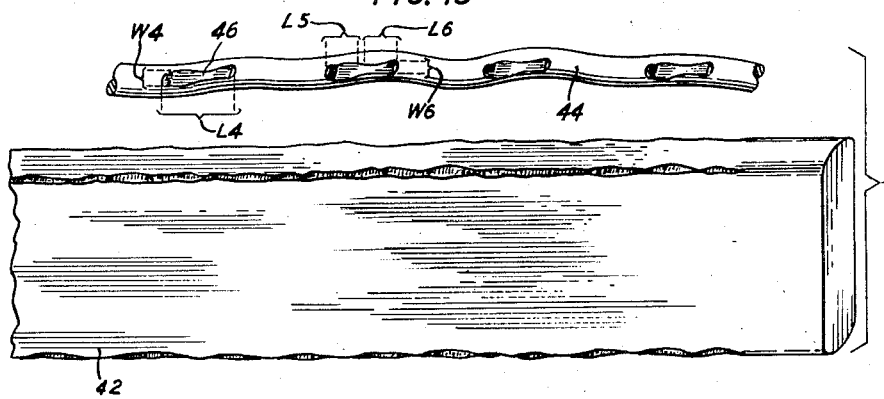
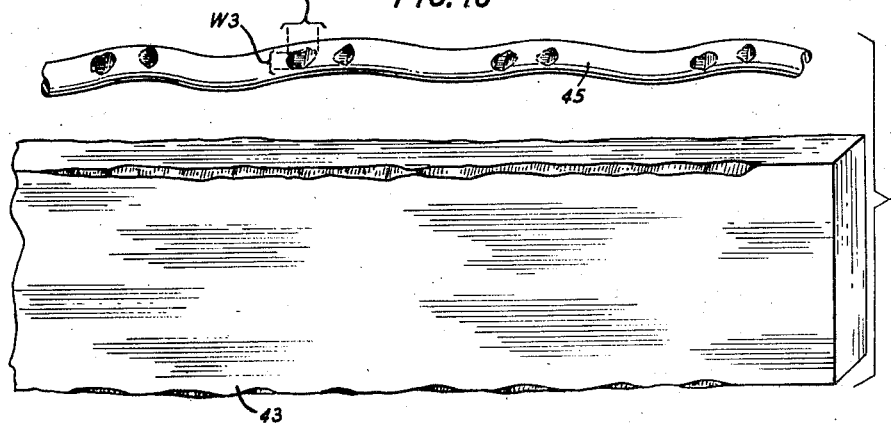
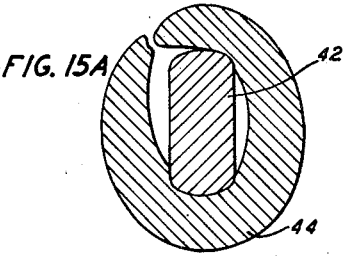
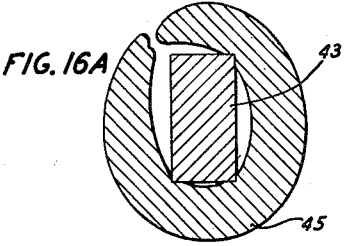

Aug. 14, 1956  R. F. MALLINA  2,759,166
WRAPPED ELECTRICAL CONNECTION
Filed June 20, 1952  6 Sheets-Sheet 5
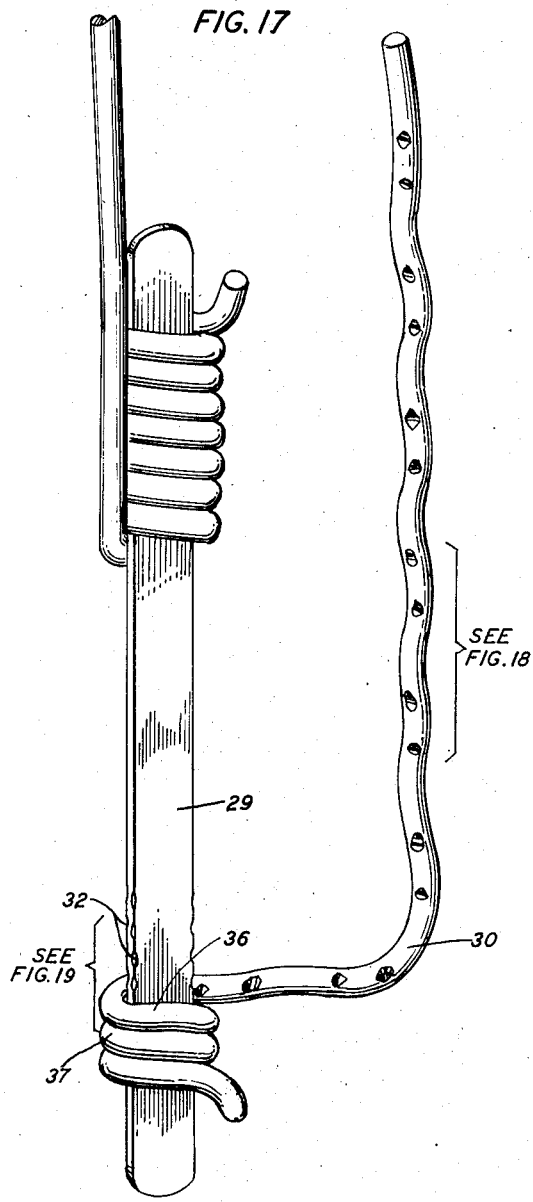
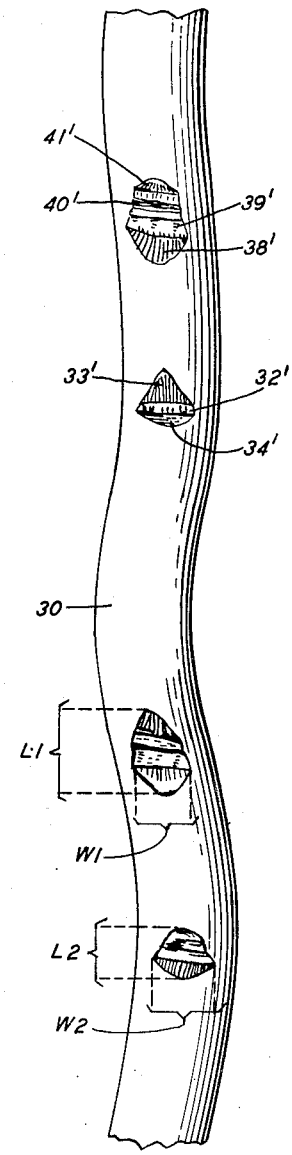
INVENTOR
R. F. MALLINA
BY
ATTORNEY Aug. 14, 1956  R. F. MALLINA  2,759,166
WRAPPED ELECTRICAL CONNECTION
Filed June 20, 1952  6 Sheets-Sheet 6

INVENTOR
R. F. MALLINA
BY
ATTORNEY

United States Patent Office 2,759,166
Patented Aug. 14, 1956

2,759,166

WRAPPED ELECTRICAL CONNECTION

Rudolph F. Mallina, Hastings on Hudson, N. Y., assignor to Bell Telephone Laboratories, Incorporated, New York, N. Y., a corporation of New York Application June 20, 1952, Serial No. 294,607

10 Claims. (Cl. 339—276)

This is a continuation-in-part of application Serial No. 109,308, filed by R. F. Mallina on August 9, 1949, for "Wrapped Connection," and abandoned on April 20, 1953.

This invention relates generally to wrapped connections, more particularly to electrical wrapped connections which depend for their electrical and mechanical properties solely upon pressures due to mechanical stresses caused in and by the elements of the connections themselves rather than upon soldering or brazing or welding or other mechanical bonding of the elements of the connection by means of binders or binding means distinct from the elements of the connection or by means of methods in addition to or separate from the method of mechanically interconnecting the elements of the connection by pressure alone, and specifically to a wrapped connection comprising an electrically and mechanically self-sufficient helical or otherwise coil-like construction.

While the invention has been described generally as an electrical connection, the use of the term "electrical" is used merely as indicative of the most likely and preferred field of utility for the invention. The wrapped connection falling within the spirit of the present invention is in no way to be considered as limited in its scope or intended field of utility to electrical connections.

Furthermore, while one of the greatest advantages afforded by the present invention lies in the fact that it need not be soldered or welded, etc., in order to stabilize the mechanical and electrical properties of the connection over a considerable period of time in use, that fact is in no way to be considered as inferring that the invention is so limited. Whether or not the wrapped connection according to the present invention is soldered or welded or brazed or otherwise bonded by some method other than by pressure alone after or during the process of its construction is immaterial. The spirit of the invention includes a wrapped connection irrespective of such additional procedures which may be applied to the elements or parts thereof, which additional procedures may, for one of many reasons, appear desirable to those making use of the invention.

So-called "solderless" connections, which comprise the field of connections wherein the present invention shows up to great advantage, are generally considered as those whose structure does not necessarily include mechanical or electrical properties attributable to the aforementioned additional procedures over and above mechanical pressure. There have been many such connections all of which involve the same basic concept of maintaining over a considerable period of time sufficient continuous mechanical pressure or stress between abutting or connecting elements of the connection by means only of a reserve of potential stress energy stored in the connection to insure adequate mechanical strength and, where used as electrical connections, to insure satisfactory electrical properties. Such connections of the prior art include clip or snap connections where the stresses are maintained by energy stored in some spring means, sockets or telescopic or commonly called "male and female" connections where the stored energy represented by a side pressure on or by a female receptacle due to self-tension or otherwise maintains good contact pressure against a male element slidably housed therein, crimped connections where one element or a part thereof is mechanically forced into or about another element or part thereof, swaged connections where a sleeve means is compressed over both elements or parts thereof to hold them together, screw connections where two contact elements are pressed and held together by means of tightened screw and nut members where generally the nut member is one of the elements of the connection, and wrapped connections, the latter being the field of subject-matter of interest in regard to the present invention. The foregoing summary of prior types of solderless connections is not intended to be exhaustive; but, it does, it is believed, summarize the better known, more commonly employed group of such connections.

The present invention resides in a wrapped connection per se comprising a metallic terminal, electrical or otherwise, including at least two longitudinal surfaces which meet at an abrupt edge and about which a plurality of turns of a filamentary metallic member or wire or conductor, round or otherwise, are wound under such conditions that in the thus-produced wrapped connection well-defined contact areas are formed on conductor turns and on terminal edge between the turns of conductor and terminal edge, portions of which areas are sheared, mating depressions located on both conductor turns and terminal edge and localized at the terminal edge and created due to plastic deformation of both materials caused by compression and shearing stresses induced in both conductor and terminal during the wrapping operation, and which contact areas of wire and terminal exert upon each other an average compression stress high enough to insure that these contact areas, including the above mentioned portions thereof, will remain pressed together under high compressive force for a considerable period of time in a metallically-clean, intimate, gas-tight contact area.

The minimum basic requirements of a wrapped connection which satisfies the above conditions are:

1. There are at least two turns of wire in the wrap.
2. The contact areas on wire and terminal include portions which are sheared, mating depressions in both wire and terminal mutually created due to plastic deformation of both materials during the process of making the connection. These portions will comprise metallically-clean, intimate, gas-tight connections of contact surfaces.
3. The contact area portions comprise mating depressions in wire and in terminal edge localized at the terminal edge.
4. There is potential energy stored in the structure in the form of stresses in the wire and in the terminal such that elastic recovery of wire or terminal or both (depending upon their relative stiffness) can counteract losses in contact area pressure, such as may be caused by cold flow of the materials and by other ambient and internal conditions tending to loosen the connection.

In addition to the above outlined basic structural essentials of the present invention there are a number of factors which may be described as refinements of the broader concept and which comprise limitations in definitions of more specific and more preferred embodiments of the invention. Such matters are:

5. The sum of contact areas in an acceptable connection is about 25 per cent or greater of the cross-sectional area of the wire. The preferred connections have an aggregate of 100 per cent or greater and an ideal connection has an aggregate greater than the wire area. This limitation is of particular significance in dealing with the invention when embodied in electrical wrapped connections where the contact area of the connection has a direct bearing on the electrical resistance or impedance thereof.

6. Each individual contact area is preferably such as to have a length-to-width ratio from about 1 to about 6. This limitation will insure sufficient localization of stresses and a sufficient contact area foundation to withstand infiltration of corrosion, particularly if the smallest width of contact area is not less than about one mil.

7. The average contact pressure per contact area is preferably not less than about 75 per cent of the yield stress of that material of the wire or terminal which has the lower yield stress. This lower limit for such average pressure will insure a minimum acceptable tightness of connection.

8. The material of a suitable wire is a material which has a recovery of say not less than about 5 per cent for an extensional strain of say about 15 per cent. For the more suitable and more preferred wires the material is one which has a recovery of not less than 5 per cent and not more than about 25 per cent for an extensional strain of about 15 per cent; in other words, a material exhibiting a large difference between the yield and breaking strains, such as copper, aluminum, soft iron, etc. This listing of specific examples of materials is not intended to be exhaustive.

9. The material of the more preferred terminal is one which has a shearing modulus of about $10^5$ pounds per square inch or larger, such as brass, nickel-silver, tungsten, Nichrome, etc. This limitation imposed upon preferred terminal material will insure that the material thereof will withstand the shearing and crushing forces exerted upon it in the completed connection. The examples of specific materials given is not intended to be an exhaustive list.

10. In the more preferred connections it is suggested that the ratio of the torsional stiffness of the terminal to that of the wire be about three-fourths or greater. This limitation is independent of cross-sectional shapes and defines the relation between the elements such as would exist in the more commonly preferred connections according to the invention.

11. While there is no particular reason why one cross-sectional shape of wire would be chosen over another, the probable preferred use of the present invention will involve round or substantially round wires. The wire should be solid but not necessarily homogeneous (that is, it may be composite).

12. While basically the only requirement in the shape of the terminal is that it contain at least two longitudinal surfaces (not necessarily straight or flat) which meet at an abrupt edge, the most preferred types of terminals are those whose longitudinal sides are substantially parallel and straight and whose cross-sections are sharp-edged polygons having internal angles of about 150 degrees or less, such as triangles, squares, diamond shapes, pentagons, hexagons, etc. These are the easiest to produce and make the best connections but do not necessarily comprise an exhaustive range or family of adequate terminal shapes. The shape of the cross-section of a suitable terminal may be defined as including an abrupt edge where two longitudinal surfaces of the terminal come together, as has been indicated above. A somewhat mathematical definition of how abrupt an edge one should use in the preferred connections is stated indirectly by the proposition that for each turn the wire should be bent around a curve where the ratio of wire diameter to mean radius of curvature is about four-tenths or greater for the angle of wrap throughout that curvature and that this angle should be at least about 60 degrees. Parenthetically, it should be noted that the angle of wrap is here defined as an angle with its apex at the center of curvature and which measures degrees of curvature. These conditions must be met in order for the wire turns to be insured of at least locking themselves onto the terminals. Such language emphasizes the necessity of an abrupt change of direction around an edge but does not necessarily require that the edge be the type of edge which one would find at the apex of a well-defined mathematically perfect dihedral angle. The abrupt edge which is contemplated in preferred terminals is the type of sharp, abrupt edge which would be produced by such operations as cutting, coining, stamping, molding, milling, forging, punching, flattening, extruding, etc. during a practical process of manufacturing a terminal. In other words, this abrupt edge is not a mathematically definable structure but is a practical structural condition involving an abrupt change of direction of a terminal surface or an abrupt meeting of two such surfaces. Such an abrupt edge as may be adequate could very easily involve a certain amount of curvature rather than being actually mathematically sharp. The only necessary characteristic of such an abrupt edge is that it have appreciable penetrating power relative to the wire.

13. In suitable connections the wrapped tension (that tension remaining locked in the wire turns in the completed connection per se) should be about 10 per cent or greater of the tensile breaking force of the wire. The most suitable connections will be those whose wrapped tension does not exceed about 75 per cent of the tensile breaking force of the wire. Sufficient wrapping tension (tensile stress or other stress such as bending stress applied to the wire during the wrapping of a preferred connection) is employed to insure these ranges of wrapped tension after relaxation of the metals takes place when the wrapping tension or other wrapping stress is removed.

14. The potential energy or elastic reserve locked into the completed connection is evidenced by stresses locked in the wire turns and in the terminal, which stresses, by virtue of the stiffness of the materials, causes elastic strains in wire and terminal. In preferred types of connections such potential energy or elastic reserve is manifested in a measurable elastic torsional strain or twist in the terminal caused by the coil turns attempting to unwind from their stressed condition. This elastic strain is a measure of the locked-in forces which are at play in the structure and which are responsible for the maintenance of good contact pressure over a considerable period of time, even in view of cold flow and other internal or external ambient conditions tending to cause loosening of the connection.

The foregoing statement of the invention in its various degrees of scope is a preview by items 1 through 14 of engineering considerations which may enter the determination of a wrapped connection according to the present invention. That is, these factors may be considered in making such a connection and thereby may fix beforehand the character of the method of its manufacture. Furthermore, a wrapped connection can be analyzed to ascertain whether or not it satisfies the conditions of structure specified for it.

Another embodiment of the invention contemplates the above terminal, and the art of producing it, with the addition of serrations or intentional roughening along at least one longitudinal surface of the terminal for the purpose of increasing the force necessary to strip or shear the coil from the terminal. Other embodiments of the invention are shown on the drawings and discussed at some length hereinafter.

In any prior solderless connection, perhaps without exception, the phenomenon of cold flow of metal while under pressure or stress is probably the greatest cause of short life of what may have been initially (directly after the connection was made) a satisfactory electrical and mechanical connection. Metals under stress tend to assume a less stressed condition and heat, shock, vibration, corrosive atmosphere, etc., tend to accelerate this loosening of such connections. Such mechanical loosening coupled with the concurrent growth of corrosive films preclude long life for such connections subjected to such conditions and limit the utility thereof to applications not involving such conditions.

The objective of the present invention is to realize a connection which will maintain satisfactory mechanical or electrical, or both, characteristics irrespective of normal cold flow or creep of the metal constituents and irrespective of corrosive atmosphere, if present. This objective is accomplished by so constructing the connection that the initial stresses induced in the coil and terminal are high enough such that subsequent creep or cold flow, tending to relax the stress, will not, over a considerable period of time which may be a number of years, be sufficient to reduce the stresses below the level which insures a satisfactory contact pressure. Accelerated life tests, such as vibration tests and corrosive atmosphere tests, have shown that the present invention promises to result in a long-life, satisfactory electrical and mechanical wrapped connection.

Although wrapped connections, generally considered, have been known for some time in the art, it is believed that the present invention, for the first time, teaches the structure, and method of producing it, necessary for a long-life wrapped connection which embodies features which result in a really practical satisfactory electrical or mechanical connection, or both. The novelty and inventiveness appear to reside in the conception that when a conductor is wound under stress in a plurality of turns about a suitable terminal, such as outlined above, the resulting helix or coil will not unwind but, due to many factors, will remain coiled in a highly tensioned state, thereby to exert a satisfactory long-life compressional contact force upon the edges of the terminal without detrimental effects due to the inevitable cold flow phenomenon.

The advantages afforded by the use of the present invention are those which one would realize in a compact connection having uniformity, clean contacts and distributed stresses, requiring no heat, precluding solder splashes and clippings and necessitating little, if any, inspection. It will be recognized by those skilled in the art that a single connection, particularly those used for electrical purposes, affording all of the above-mentioned advantages is a substantial advance in the art.

The above-outlined features of the present invention will be described in detail hereinafter in connection with the various figures of the drawings forming a part of the present disclosure, the drawings being described generally as follows:

Fig. 1 shows a cut-away side view of one embodiment of the present invention;

Fig. 2 is an end view of the terminal of Fig. 1 showing a terminal with somewhat rounded sides but having four abrupt longitudinal edges;

Fig. 3 is a view of the other end of the structure of Fig. 1 without the cut-away presentation;

Figs. 5, 6, 7 and 8 are useful in showing the elastic energy analog between the present invention and the prior art type of binding post solderless connection;

Fig. 9 is an amplified showing of what is believed to be one of the reasons why the completed connection retains its stresses;

Fig. 10 is a representation of a section taken approximately along the line 10—10 of a connection such as is shown in Fig. 3;

Fig. 15 illustrates the type and nature of the contacting areas produced on wire and on terminal edges in a connection such as is illustrated in Fig. 1;

Fig. 15A is a reproduction of a cross-section of a connection such as is shown in Fig. 1;

Fig. 16 illustrates the type and nature of the contacting areas produced on wire and terminal in a connection similar to that of Fig. 1 but embodying a substantially rectangular terminal having more abrupt edges;

Fig. 16A is the same type of representation as Fig. 15A except that it shows another embodiment of the invention using a substantially rectangular terminal with more abrupt edges such as is shown in Fig. 16;

Fig. 17 illustrates two wrapped connections made according to the present invention on a substantially rectangular terminal having fairly sharp edges, such as the one illustrated in Fig. 16, and where one of the connections has been partially unwound;

Fig. 18 is a magnified showing of the length of wire enclosed in the bracketed portion labeled "See Fig. 18" of Fig. 17.

Figure 4B:
Figs. 4A through 4V show an inexhaustive group of various terminal configurations upon which wrapped connections may be effected by means of the highly tensioned coil principle characterizing the present invention.
Figure 4D:

Fig. 5 illustrates a typical screw and nut connection where a wire 1 is compressed between a screw 2 and a nut member 3, the latter generally comprising part of the electrical connection. In a connection of this type the compressional forces, such as 4 of Fig. 6, acting upon the wire 1 are in a general sense balanced by tensile force, such as 5 of Fig. 6, in the screw. Actually, the analysis of the forces at play in such a connection is much more complex than just stated. The screw head 6 bends, the shank 7 of the screw 2 elongates, the threads of both screw 2 and nut 3 compress and a certain amount of bending takes place in the nut 3. What happens when such a connection is made is that a round bare wire 1 is looped around the loose screw and the screw head is then tightened down on the wire. The wire is flattened, thereby creating flattened contact areas between the wire and the respective lower and upper surfaces of the screw head and the nut. This is a pressure connection having a large contact area, a high contact pressure, great mechanical stability and long life. Furthermore, it is easily disconnected. The only disadvantages of such a connection are probably that it is fairly large in size and its cost is high. The wrapped connection, which is the subject-matter of the present invention, exhibits not only all of these advantages of the screw connection but also is small in size and is relatively inexpensive.

The reason why a pressure connection having appropriate contact area is a good mechanical and electrical connection is that there is locked into the structure a potential of mechanical energy which is available to insure good contact pressure over periods of time during which the connection has a tendency to lose its tightness due to cold flow of the materials and due to ambient conditions tending to loosen or deteriorate the connection, such as temperature, vibration, shock, corrosive atmosphere, humidity, etc. In the screw connection of Figs. 5 and 6 there is mechanical energy stored in compression 4 in the wire, tension 5 in the shank 7 of the screw 2, bending of the screw head 6, compression of the threads on the screw and nut, bending in the nut, etc. As the connection tends to loosen, this stored-up energy releases itself to take up that tendency to loosen. Part of this energy will be in the wire and part in the screw and nut. The forces locked into the various parts of the connection are balanced but due to various properties of different materials, such as different stiffnesses, the individual parts will contribute various amounts of recovery or elastic dimensional movement, and thus different degrees of energy, upon relaxation of stress. For instance, the wire 1 might be soft copper, which, in a very tight screw connection, could be stressed at least in part far beyond its yield stress, whereby the greater portion of the deformation of the wire would be permanent set. However, when relaxed, the wire would expand somewhat thereby giving up whatever potential energy was stored therein in the form of an elastic strain. The screw 2 and nut 3, on the other hand, might be of relatively stiff material, which would probably not be stressed in part very far beyond its yield point, if even as far as its yield point. When relaxed, such screw and nut would probably show a small movement in giving up its locked-in forces. Although the stresses locked in both parts are roughly comparable in magnitude, the stiffer members, due to their correspondingly smaller elastic strains, will represent less stored energy than the relatively less stiff members. At any rate, there is potential mechanical energy stored in such a pressure connection which, when permitted to do so by an attempt by the parts to loosen, is released in the form of a slight relaxation of the elastic strains to maintain adequate contact pressure at the contact areas. The wrapped connection, which is another form of pressure connection, also exhibits this locked-in potential of mechanical energy, as will be explained.

Fig. 7 shows a wire 8 coiled about a round terminal 9. Assuming that the wire 8 is under some average longitudinal tension stress, then Fig. 8 is a diagrammatical representation of the general stresses locked in the structure. The wrapped tension 10, or hoop tension 10, or longitudinal wire tension 10, causes the terminal 9 to be under radial compression, such as 11, all throughout the periphery of the terminal 9. Here there is potential energy stored in the elastic strains in the wire 8 and terminal 9. Fig. 9 is an exaggerated showing of the interlocking jagged surfaces 12 of wire 8 and terminal 9, which, even on very smooth surfaces, could cause sufficient frictional drag to prevent the wire 8 from coming completely loose from terminal 9, except when under repeated shock or vibration.

For reasons which will become apparent later, wrapped connections which depend for their mechanical and electrical stability on pressure alone (that is, on the stored-up mechanical energy) without the aid of solder, etc., must involve terminals whose cross-sectional shapes in the area to be surrounded by the coil of wire deviate from circles. The wrapped connection of Fig. 7 will act like a nut on a screw. If the connection is vibrated the coil of wire 8 will gradually unwind like a loose nut on a screw. Furthermore, there is so much contact area between the inside of the turns of wire 8 and the outer surface of the terminal 9 that the contact pressure holding them together will be too low to insure a satisfactory connection, unless the hoop tension 11 is prohibitively high. The terminal cross-section must deviate from a circle for at least two reasons. First, such deviation will preclude a loosening of the connection caused by the type of looseness found in a loose nut on a screw. Second, the deviation will present at least one abrupt longitudinal terminal edge over which the wire turns will be stretched or bent. This abrupt change in direction around the periphery of a suitable terminal will localize the usable contact area at that edge thereby to localize high contact stress thereat even for relatively low hoop tension. Thus, even if the hoop tension is originally relatively low, subsequent relaxation thereof will not reduce the contact pressure below a satisfactory level, as would be the case where the contact area were relatively large, as in the case of a round terminal.

The previous discussion of Figs. 5, 6, 7, 8 and 9, concerning screw connections and wrapped connections involving round terminals, has been presented as a background for subsequent discussion of the subject-matter of the present invention—a wrapped connection of special structural character. The potential energy analog to the screw connection and the frictional drag caused by the tensioned turns apply as well or even more so to terminals with abrupt edges as will be apparent from subsequent description.

Figure 4F:
Figure 4H:
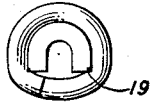
Figure 4K:
Figure 4A:
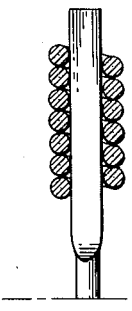
Figure 4C:
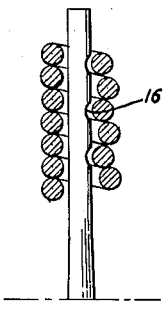
Figure 4E:
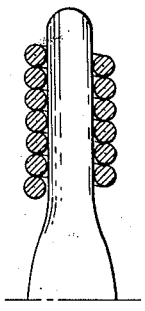
Figure 4G:
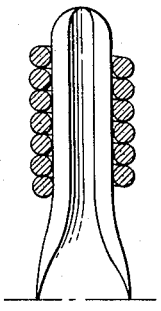
Figure 4J:
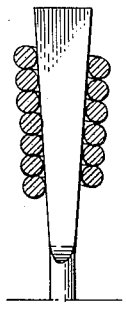
Figure 4M:
Figure 4P:
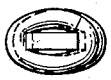
Figure 4R:
Figure 4T:
Figure 4W:
Figure 4L:
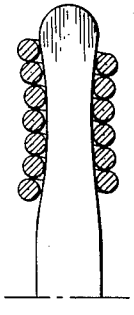
Figure 4N:
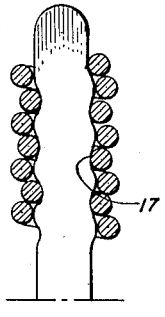
Figure 4Q:
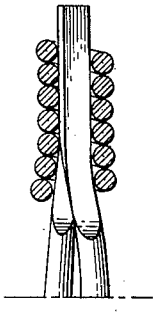
Figure 4S:
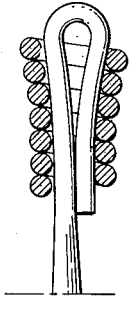
Figure 4V:
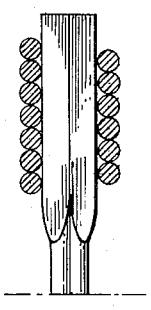

Figs. 4A to 4W illustrate only ten of a large number of possible wrapped connections involving terminals which embody the right kind of abrupt longitudinal edge to be suitable for good wrapped connections. Fig. 4B illustrates a terminal such as is shown in Figs. 1, 2, 3 and 10. This terminal is a partially flattened originally round terminal which has at least one abrupt edge, such as 13 of Fig. 2, which comprises an abrupt change of direction around the terminal periphery. For best results the dihedral angle 14 formed by the two surfaces which meet to produce this edge 13 should be about 150 degrees or less. Here the edge 13 will actually have an appreciable radius to it rather than being mathematically sharp. For instance, a typical such terminal might measure about 30 mils by 18 mils with about a 1 mil radius at the edges. As shown in Figs. 4C and 4N, the terminal may have artificial serrations 16 and 17 along its length, thereby requiring a higher force to strip the coil from it. The terminal of Figs. 4E and 4F is a punched stock terminal having very sharp edges 18. Other terminals such as shown in Fig. 4H, for instance, have almost square corners 19 comprising edges formed by flat surfaces meeting at about 150 degrees or less, such as about 90 degrees. The terminal may be a single fish tail (Fig. 4J), a double fish tail (Fig. 4L), made up of two or more parts (Fig. 4Q) or may be reentrant within the coil of wire (Fig. 4S). Figs. 4V and 4W show a particularly useful type of terminal which is made by coining two adjacent round terminals into substantially a diamond cross-sectional shape as shown in Fig. 4W. Of course, this coining could be accomplished on a single round terminal as well as on a multiple one and could be used to produce cross-sectional shapes other than the diamond shape shown. This particular arrangement readily adapts round terminals to wrapped connections by producing abrupt edges on the terminals. A particularly good terminal of this type is one having two edges of about 120 degrees each and two edges of about 60 degrees each. This diamond coining of round terminals into shapes having abrupt edges is probably more satisfactory than merely partially flattening round terminals into the shape shown in Figs. 4A and 4B. Many other forms and shapes of terminals may be suitable. The ones shown in Figs. 4A through 4W are merely illustrative.

Figure 11:
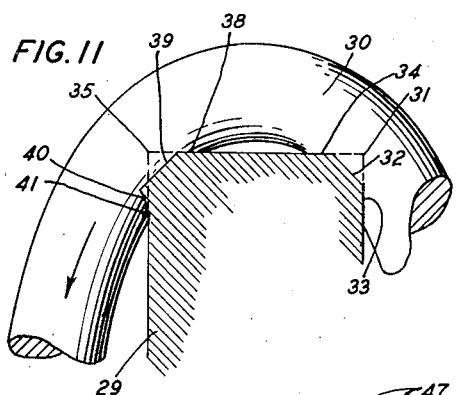
Fig. 11 is an amplified representation of certain specific structural peculiarities at the terminal edges of a wrapped connection.

In Fig. 1 is shown a terminal 20 having wound thereon several turns of a solid but not necessarily homogeneous conductor 21, which is an extension from the insulated conductor 22. The terminal 20, as above discussed, is a partially flattened-originally round terminal having at least one abrupt edge 13 formed by the meeting of a flat surface 23 with a curved surface 24 in substantially a dihedral angle 14 of about 150 degrees or less. The turns of wire 21 are mechanically locked about the terminal 20 under longitudinal tension. When this connection is made the abrupt edge 13 of terminal 20 cuts into the turns of wire 21 and the latter in turn shear the edge 13 of terminal 20 at a number of points. The result, among other effects to be discussed later, is to produce depressions 25 in the terminal edge 13, which depressions 25 mate with similar depressions or portions of the contact areas on the wire turns. These portions of the contact area of the wire turns are not particularly evident in Figs. 1 or 3 or 10 but they are shown in Figs. 11, 17 and 18, to be discussed hereinafter.

It is to be noticed from Figs. 1 and 3 that the terminal 20, in the completed connection, has a torsional twist in it. This twist represents, in at least a part thereof, an elastic torsional strain in the terminal 20 as a result of the turns of wire 21 attempting to unwind from their stressed condition. The actual twist angle may be all elastic strain or it may include some permanent set. The tensile stress along a majority of the longitudinal fibers of the wire 21 is locked-in because the individual turns are mechanically locked about the terminal during the winding process. This tensile stress, being along what may be considered as substantially a helix and being locked into the turns of that helix, naturally has a tendency to relieve itself. The effect of this tendency to unwind is met by a resistance which is the torsional stiffness of the terminal. A balance will be reached where the torsional stiffness of the terminal balances the comparable helical stiffness of the coil. Due to this balance, the terminal will be strained elastically in the torsional direction effecting a measurable elastic twist angle. It is this elastic torsional strain in the terminal which is the most significant visible structural manifestation of the potential of mechanical energy stored in the connection. Such elastic strain is, of course, measurable with respect to the same terminal 20 from which the turns of wire 21 have been carefully removed; that is, the same terminal 20 relieved of its elastic torsional strain. It is obvious that the elastic twist angle may not be visible in a completed connection because the unstressed terminal could have a natural unstressed twist in the opposite direction which would be nullified by the torsional strain in a completed connection.

Fig. 10 is a representation of a photomicrograph of part of a connection like that of Figs. 1 and 3 and taken as nearly as practical along the line 10—10 of Fig. 3. In Fig. 10 it is noted that the turns of wire 21 are intimately pressed against the edges, such as edge 13, of terminal 20. The depressions or indentations 25 in the terminal 20 are shown in Fig. 10 where the turns of wire 21 have sheared the edges such as edge 13, of the terminal 20. It is shown in Fig. 10 how the effectiveness of the end turns 26 and 27, or at least a portion of these end turns, is lost due to the fact that the end turns 26 and 27 do loosen up a little. This loosening, as shown diagrammatically in Fig. 9, not only is inevitable but also is necessary and beneficial in that eventually some part of these end turns 26 and 27 will be locked mechanically about the terminal. In Fig. 9 it could be said that the location 28, representing approximately the half way mark of the end turn, begins to be definitely locked. The fact that about one-half or so of the first and last turns is used to secure a mechanical lock is proof that the rest of the turns are securely locked. Thus, in a connection not requiring great mechanical strength, etc. at least two turns of wire 21 are necessary in order to insure that there will be at least about one full locked turn.

While there may be many means devised for making such a wrapped connection, it is considered best to employ some sort of tool whereby a degree of control may be exercised over the making thereof. Patent 2,585,010 of February 12, 1952 to C. N. Hickman, R. F. Mallina and F. Reck discloses one type of tool involving tool principles which may be used to make connections according to the present invention. There may well be other tools or apparatus which could be employed for such purposes.

Figure 13:
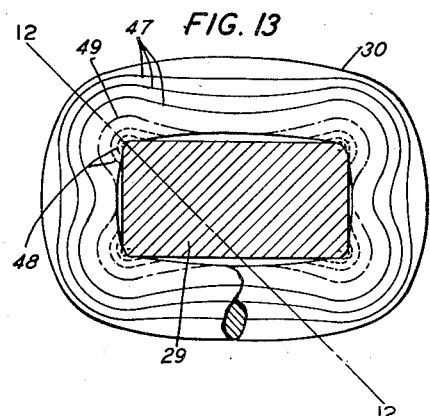
Fig. 13 is a diagrammatical representation of the stress condition in the wire turns of a typical connection.
Figure 12:
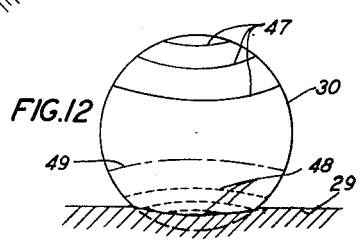
Fig. 12 is another amplified representation of certain detailed structural aspects of the contacting areas at the terminal edge and certain stresses in the wire turns.
Figure 19:
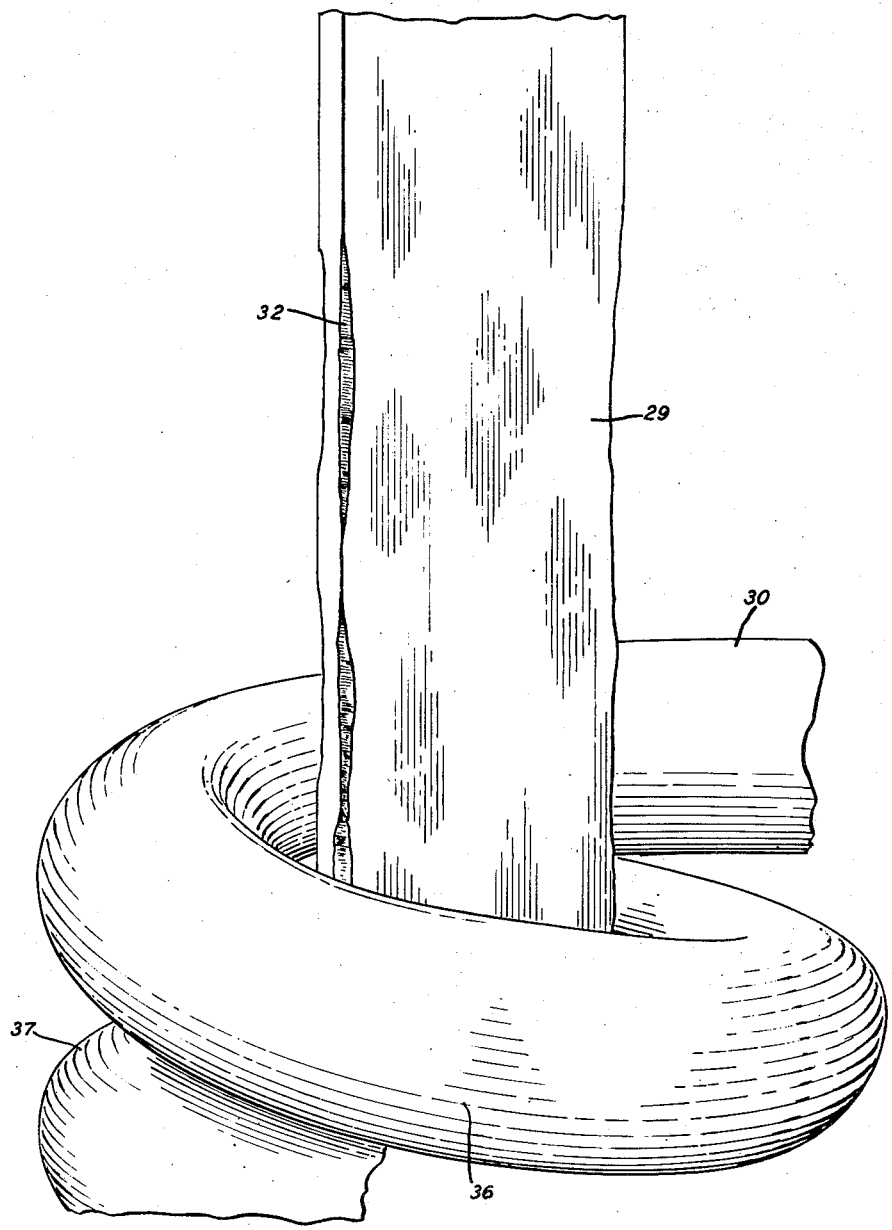
Fig. 19 is a magnified showing of the length of terminal 17 enclosed in the bracketed portion labeled "See Fig. 19" of Fig. 17.

Figs. 11, 12 and 13 are helpful in analyzing the structure of and the probable stress condition in a wrapped connection. In order to simplify the discussion a rectangular terminal 29, or part thereof, is shown in Figs. 11, 12 and 13. Fig. 17 shows a wrapped connection of a round wire 30 on a rectangular terminal 29. Figs. 18 and 19 are amplified showings of the correspondingly marked portions of Fig. 17. Fig. 11 shows what happens at the edges of the terminal 29 as a turn of wire 30 is wrapped around the cross-sectional periphery of the terminal 29 such that tensile stress is induced in the wire 30 in a majority of the fibers. As the wire 30 is bent around what was the edge 31 this edge is crushed and sheared and deformed to a portion 32 of the contact area 33—32—34 of this particular corner for this wire turn. These parts of the contact area are similarly designated in Fig. 18 by 32', 33' and 34' which show the corresponding contact area in the wire 30 which is pressed against the contact area on the terminal 29 to provide the intimate current carrying and mechanical locking parts of the connection. It is to be noted that the contact areas of the wire 30 and the terminal 29 comprise the three portions 32—32', 33—33' and 34—34'. Of this contact area the portions 33—33' and 34—34' include portions 33' and 34' of the wire 30 which overhang and appear to press against the terminal sides substantially without deformation at this part of the terminal 29. The portions 32—32', however, comprise mating depressions (see 32' of Fig. 18 and 32 of Fig. 19) in both the wire turn and the terminal edge. These two contact area portions 32 and 32' are particularly intimate and gas-tight. They are caused by shearing action such that there is little chance, if any, for the two surfaces to become oxidized at the time that the clean metal surfaces are produced and pressed together, and any other oxidation or other coating on the wire or terminal is removed in the process. This accounts to a great extent for the extremely good electrical stability of the wrapped connection when subjected to such destructive tests as vibration, shock, heat, cold, humidity, corrosive atmosphere, and combinations thereof. The only really noticeable parts of the terminal 29 where deformation is seen are such depressions as 32 in Fig. 19 and a burr (see 40 of Fig. 11) on the trailing side of the depression on the trailing edge of the short side of the terminal 29. In Fig. 11 is shown a difference between the latter edge condition and that at edge 31, which is the leading edge of the short side. In Fig. 11 the edge 35 has been reduced to a slightly longer and more complicated surface content than was the leading edge 31 of the short side of the terminal. This is probably because a rectangular terminal 29 was used and because a wrapping tool involving principles like those shown in the Hickman et al. Patent 2,585,010 was used to wrap the connection. The tool had a feed hole for the wire, which hole was at a substantially constant distance from the geometric longitudinal axis of the rectangular terminal. Due to this particular arrangement the wire 30 was bent around the two terminal edges 31 and 35 by forces which were effective at different distances from the preceding edge, thus effecting different compressive and crushing forces at the two edges 31 and 35. This is evident from Fig. 17 where the relatively long loop or length 36 of wire 30 is in advance of the edge 31 and the relatively short loop or length of wire 37 is in advance of the edge 35. It is evident that if the bending force is applied at a constant distance from the geometric longitudinal axis of a rectangular terminal 29, then more force is effective at edge 35 than at edge 31. Since wrapping tools, like the one shown in the Hickman et al patent, are recommended in order to have the advantage of control over the connections, wrapped connections made with tools of like principles have been used as illustrative. Other tools or means for making suitable wrapped connections could very well alter the detailed character of the individual contact areas, and the explanation of the details of contact areas shown herein is not intended to limit the scope of the invention. As is most clearly seen from Figs. 11 and 18, this trailing contact area comprises the portions 38, 39, 40 and 41 on the terminal 29 and portions 38', 39', 40' and 41' on the wire 30. This contact area is about as wide as the leading edge contact area but is somewhat longer and more complicated. The trailing edge contact area, however, has the same general make-up in the overlapping portion 38—38' and 41—41', where the wire 30 overlaps the edges of the terminal 29, and in the mating depressions 39—39' of terminal 29 and wire 30. The additional portion 40—40' may be considered substantially as part of the overlap of wire 30 and part of the depression in wire 30 and terminal 29.

It should be emphasized at this point that these contact areas are produced very quickly and by shearing and crushing of both wire 30 and terminal 29. Any oxide, or other insulating layers which may have existed on terminal 29 and wire 30 will be removed to produce intimate, gas-tight, metallically-clean, mating depressions and deformations in wire 30 and terminal 29. This is of particular importance when one or both of the parts of the connection (wire and terminal) is a material which, like aluminum, has a great affinity for oxygen. The rapidity with which such contact surfaces are produced and the crushing and shearing and other deformations which are involved in the process will not allow any oxidation to take place during or after the period of time necessary to make the connection. Thus, even with aluminum, an oxide-free, gas-tight connection is possible.

In connection with the above discussion of the nature of the contact areas, it will be remembered that the difference between the type of areas 32'—33'—34' and 38'—39'—40'—41' (see Fig. 18) produced in the wire turns at the leading and trailing edges 31 and 35 (see Fig. 11) of the short side of a rectangular terminal is due to the difference in the length of wire (see loops 36 and 37 of Fig. 17) ahead of these respective edges and to the means used to make the connection. If a square, or other regular polygonal cross-section terminal were used, it would be discovered that substantially the same type of contact area would be produced at all terminal edges and that they would be substantially equally spaced along the wire rather than unequally as is evident in Fig. 18. The type of contact area produced in the wire by this regular polygonal cross-section terminal would be somewhere in between those two types shown in Fig. 18, depending upon the number of sides to the polygon and upon other factors.

In Fig. 18, the contact areas on the wire 30 are defined generally as length L1 and width W1 for the trailing edge area and as length L2 and width W2 for the leading edge area. There are certain structural limitations which may be specified with respect to these areas in order to insure the best type of connection. That is, the most preferred types of wrapped connections will be those where the ratio of L/W ranges from about 1/1 to about 6/1. The best connections are those where L/W is about 1/1. This will insure sufficient localization of stresses and sufficient contact area foundation to withstand infiltration of corrosion, particularly if the greatest linear dimension, such as W1 or W2, of the width of the contact area is not less than about 1 mil. It is considered that the width W is the shortest general dimension irrespective of its orientation. In the areas illustrated, the width happens to be about perpendicular to the wire length. When one is concerned with the electrical properties of a wrapped connection the aggregate of such contact areas per connection is important as a consideration entering the current carrying capabilities of the connection. In this respect acceptable connections will be those where the aggregate of the contact areas per connection (discounting the lost portions of both end turns) is about 25 per cent or greater of the cross-sectional area of the wire. The preferable and most satisfactory connections are those where the aggregate is about equal to or greater than the wire area. The ideal connection is one where the aggregate is about as shown in Fig. 18, that is, about twice the wire area.

In Figs. 15 and 16 are shown two terminals 42 and 43 and the lengths of wire 44 and 45 which have been unwrapped from the respective terminals to show a comparison between two different types of terminal edge conditions. The terminal 42 of Fig. 15, as more clearly shown in Fig. 15A, is the flattened originally round type. The wire contact areas of Fig. 15 appear to be unduly elongated, such as length L4. However, the midpoint 46 of this area is probably not properly considered as part of the effective contact areas. The lengths L5 and L6 and the width W6 are probably the effective limits of these contact areas because, as is seen in Fig. 15A, these are at the edges of the terminal 42 where the stress is highly localized. Figs. 16 and 16A show the comparable conditions for a rectangular terminal 43. Here the individual areas are well defined by length L3 and width W3. The type of contact areas produced in the connection illustrated as taken apart in Fig. 15 is probably the minimum acceptable type for a satisfactory wrapped connection. This does not necessarily mean that the terminal 42 is the only one which could produce these types of contact areas. It is merely suggested, as above stated, that the ratio of say L4/W4 be kept to about 6/1 or lower for best results.

While the nature of the contact areas and depressions has been discussed as illustrated in a connection involving a rectangular terminal, it will be appreciated that similar such physical peculiarities will be present in connections involving other terminals, such as triangles, squares, diamonds, other polygons and other shapes involving curved as well as straight terminal sides.

Any attempt at analysis of the stress distribution in the terminal and wire turns of a completed connection must necessarily be diagrammatic and be based somewhat upon theoretical considerations because of the obvious difficulty, if not impossibility, of ascertaining quantitatively the actual stress distribution in such a complex metallic structure. Figs. 12 and 13 are representations of what are believed to be the stress conditions in the wire turns. Fig. 13 is a diagram of the probable stress distribution along the wire 30 in a completed connection on a terminal 29. Reference numeral 47 in Figs. 12 and 13 designates the probable arrangement of the lines of tensile force in the wire 30. Reference numeral 48 refers to lines of compressive force in the wire 30. Reference numeral 49 represents the probable location of the neutral axis; that is, the locus of places where there is neither tension nor compression. Fig. 12 is, of course, a diagram of the probable stress distribution in the wire 30 when a section along lines 12—12 of Fig. 13 is postulated through one corner or edge of terminal 29. The closeness of the tension lines 47 near the outer surface of the wire 30, at the edge of the terminal 29, illustrates the concentration of stress there. Likewise, as is evident from an inspection of the compression lines 48, the inner surface of the wire 30 is highly stressed in compression against the edge of terminal 29. The neutral axis 49 is not in the geometric center of the wire 30 but has moved in towards the terminal 29 due to the hoop tension 47 locked in the turns. It is interesting to note that the compression 48 in the wire 30 is, of course, balanced by compression in the edge of terminal 29. This compression represents contact force holding the previously described contact areas of wire 30 and terminal 29 together. In order to maintain this compressive contact force (or pressure if the contact area is taken into account) the tension 47 in the turns of wire 30 is useful since it is locked into the wire 30. This tension 47, as has been previously explained, due to its effectiveness along what may be considered as substantially a helical coil, causes an elastic torsional strain or twist in terminal 29 (see the twist of terminal 20 in Figs. 1 and 3). This torsional stress in the terminal 29 balances the tension 47 in the wire 30 when the coil of wire 30 attempts to unwind. Thus, the compression 48 in the wire 30, the compression in the edges of the terminal 29, the locked-in tension in a majority of the longitudinal fibers of the turns of wire 30 and the torsional stress induced into terminal 29 represent the locked-in mechanical potential of energy which is available to maintain satisfactory contact pressure as the metals flow under cold stress or loosen under ambient conditions of shock, vibration, corrosive atmosphere, etc.

Figure 14A:
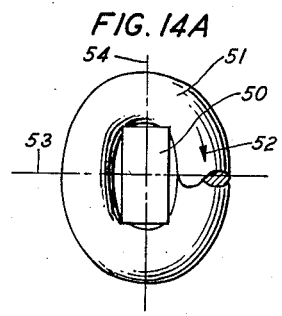
Figs. 14A through 14E are useful in explaining how a wrapped connection may be analyzed for contact force, etc.
Figure 14B:
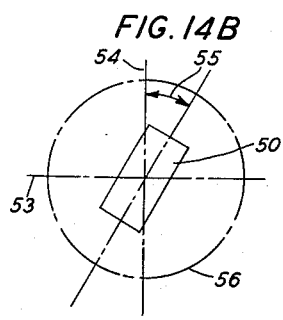
Figure 14C:
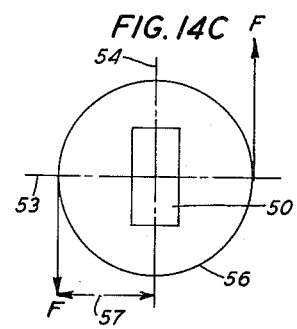
Figure 14D:
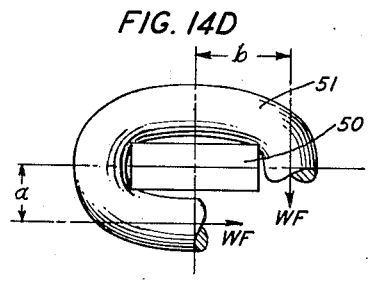
Figure 14E:
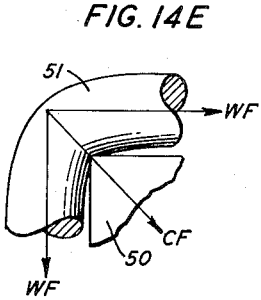

The contact pressure is the important stress when one considers whether or not a connection is satisfactory for electrical purposes. This pressure, of course, depends upon the intended use of the connection and its proposed life. For a dependable electrical connection wherein a minimum acceptable tightness of connection is to be insured, it is suggested that the average contact pressure per contact area be preferably not less than about 75 per cent of the yield stress of that material of the wire or terminal, whichever has the lower yield stress. A simple way of ascertaining the order of magnitude of the actual contact pressure at a contact area is explainable with the use of Figs. 14A, 14B, 14C, 14D and 14E. A completed connection of a wire 51 on a terminal 50 is shown in Fig. 14A with vertical and horizontal axes 54 and 53 drawn for reference purposes. It is assumed for discussion purposes that the arrow 52 designates the direction in which the coil was wound and that the unseen end of the terminal 50 is rigidly mounted. It must be appreciated that the rigidly mounted unseen end of terminal 50 may have innumerable orientations with respect to axes 53 and 54 and the orientation of the unseen end of terminal 50 will have no effect upon the immediate discussion. It is assumed that the coil of wire 51 is carefully removed from the terminal 50 to produce a condition like that of Fig. 14B. The visible unsupported end of terminal 50 will become displaced torsionally, as evidenced by a measurable elastic recovery angle 55 in Fig. 14B. This twist angle 55 represents the amount of elastic torsional strain induced into terminal 50 by the coil of wire 51 attempting to unwind in the completed connection of Fig. 14A. Next, a torque wheel 56, or other such means, may be slipped over the end of the terminal 50 by means of a suitable rectangular hole in the center of the wheel 56. Fig. 14C illustrates the next step whereby sufficient force F is used on the torque wheel 56 to twist the terminal 50 back to the orientation it had in the completed connection of Fig. 14A. Knowing the amount of force F and the torque movement arm 57 (see Fig. 14C), the torque may be computed which represents the torque which the coil of wire 51 of Fig. 14A must be exerting on terminal 50 to induce therein the elastic twist 55. In Fig. 14D dimensions $a$ and $b$ represent the two basic moment arms through which the hoop tension, or longitudinal wire tension, or wrapped force WF is effective as a torque. By these dimensions, assuming the average wrapped tension WF to be acting approximately along the structural axis of the wire, the average wrapped force or average wrapped tension WF may be computed by equating the moments of Fig. 14D to those of Fig. 14C. In this manner the order of magnitude of WF may be computed. Knowing the average wrapped tension WF and knowing the general geometry of the edge of the terminal (see Fig. 14E), the average contact force CF may be computed by simple geometry. This average contact force CF is then convertible into average contact pressure by ascertaining the amount of contact area effective at the edge of the terminal. This is done by referring to such specimens as that of Fig. 18 where the contact area 32'—33'—34' or 38'—39'—40'—41' is readily measurable.

As a wrapped connection is aged (i. e., exists for a long period of time in use), there is a tendency for the materials to cold flow and to relax the stresses in them. It is believed that if the wrapped tension WF in a completed connection is about 10 per cent or greater of the tensile breaking force of the wire 51 of Fig. 14A, and for the most preferred connections not to exceed about 75 per cent of the tensile breaking force of the wire 51, then there will be sufficient potential mechanical energy locked into the structure to provide adequate elastic recovery of the parts to insure good contact force, even taking relaxation and cold flow into account. Sufficient wrapping stress, (tension or other stress such as bending stress applied to the wire 51 during the wrapping of a connection) should be employed to insure these ranges of wrapped force after relaxation of stress and cold flow of the metals take place when the wrapping stress is removed. Exhaustive life tests, such as those to be discussed hereinafter, afford a good basis for these conclusions and beliefs.

As has been mentioned previously, certain wire materials are preferred. For instance copper, iron and aluminum wires are best adapted to the present invention. These materials all exhibit a large difference between their yield and breaking strains. That is, these wires may be stressed beyond their yield points for quite an extent of strain without breaking. This means that such materials will yield in order to form well defined contact areas but will still retain a certain amount of elastic recovery. There should be some recovery (that is, elastic strain), to the wire in order to have mechanical energy stored therein. A material should be chosen for the wire which has a recovery of say not less than about 5 per cent for an extensional strain of say about 15 per cent. This, as intended, would include stiffer materials than copper, iron and aluminum, such as piano wire or phosphor bronze wire, which have been shown to make acceptable connections. However, softer and less stiff materials are preferred, so in view of this it is suggested that for best results the wire materials be limited to those having a recovery of not less than about 5 per cent and not more than about 25 per cent for an extensional strain of say 15 per cent.

The terminal material is likewise not critical but, as is the case with most structures, there is a preferred family of materials which are best suited to the practice of the invention. The terminal material needs to be such as will withstand the shearing and crushing forces exerted upon it in the completed connection. The suggested group of materials would include those having a shearing modulus of elasticity of about $10^5$ pounds per square inch or larger, such as brass, nickel-silver, tungsten, Nichrome, etc. It is a fact, however, that aluminum wire on an aluminum terminal makes an excellent connection. Thus, there is not really any critical property of terminal material which may be specified.

As far as the relative sizes of terminal and wire cross-section is concerned, it is best to use a terminal whose torsional stiffness is greater than that of the wire. However, with care good connections may be produced on terminals where the terminal actually represents less torsional stiffness than the wire. Such connections need to be made with a great deal of care; otherwise the wire will twist the terminal all out of shape. It is unlikely that any wrapped connection can be satisfactorily produced on a terminal whose torsional stiffness is less than about 75 per cent of that of the wire. There are so many suitable cross-sectional shapes of terminals, so many suitable terminal materials and so many suitable wire materials that it is not possible to set up any criteria of sizes, particularly when other than round wires may be used. However, there is the above relationship of torsional stiffness which has some meaning. This aspect of stiffness takes into account dimensions, areas, materials, etc. in a concept which is intelligible. While there is no particular reason why one cross-sectional shape of wire would be chosen over another, unless round wires were chosen as the most widely used, the present invention is not necessarily limited to round wires. These are preferable but the only real requirement of the wire with respect to size, etc. is that it be solid but not necessarily homogeneous (that is, it could be solid and composite).

Throughout the previous discussion, while referring to the various drawings, continual reference is made to the abrupt edge of the terminal. This is an important structural condition in any satisfactory wraped connection. The presence of this abrupt edge enables the locking-in of the stresses and the production of intimate, gas-tight contact areas and the localization of high contact pressure. This matter has been discussed earlier in the description and needs no particular more detailed treatment. It may be pointed out, however, that a suitable terminal edge is not necessarily an edge formed by longitudinal surfaces which are always flat or planar or continuous, etc. In other words, the terminal abrupt edge may be discontinuous along the length of the terminal. Furthermore, it may not be straight or flat. For instance, a suitable edge could be one which itself forms substantially a helix, or likewise, along the longitudinal dimension of the terminal like a convolution such as one would find on a screw thread. In addition, such a convolution could be a single continuous ridge type of edge or could be many such ridge-type edges or could be many serrated ridge-type edges such as the type of situation one might produce as the result of knurling a round terminal. In other words, when the expression "longitudinal surfaces" is used in the claims, it is not necessarily intended, unless otherwise properly and expressly limited by other recitation, to be limited to straight or flat or continuous such surfaces.

A point of interest concerning wrapped connections, and particularly those which may be considered good enough to be solderless, etc., is the expected useful life thereof. Stress relaxation is the main source of worry here. All metals creep under the influence of stress and soft metals, such as copper, creep more than hard metals. Under ordinary conditions it sometimes takes years until creep can be noticed and measured. However, creep can be accelerated by the application of heat.

Analysis of stress relaxation in metals under stress has been made and it has been concluded that the most likely type of stress relaxation is that arising from the fact that at the grain boundaries there is an amorphous layer of material which acts like a viscous medium. A constant fixed stress will eventually cause the grains to turn with respect to each other so that part of the stress is relieved. Most measurements which have been made indicate that only about one-third of the stress is relieved in this way and the remaining two-thirds is permanent as far as this particular relaxation is concerned. This viscous type of stress relief (the one-third) depends on the temperature. The time required to relax one-half of the viscous type of stress in copper at 100° C. is about 260 years, at 200° C. about 14 hours and at 400° C. about .09 second. Hence, for any likely temperature to which wrapped connections involving typical common metals may be subjected, for all practical purposes none of the viscous stress will be relaxed in the time that the wrapped conection is likely to be used. For conservative telephone system engineering design for instance, this useful life of apparatus parts is generally spoken of as some 40 years. It is expected, therefore, that wrapped connections made according to the present invention may be used as satisfactory solderless connections for a considerable number of years even when subjected to conditions which tend to accelerate the stress relaxation and mechanical loosening.

Since the most prevelant use of the present invention will probably be in the field of electrical solderless wrapped connections, it is considered as helpful to those skilled in the art to present some discussion as to the severity of certain tests which wrapped connections according to the present invention have withstood. The ultimate test of a solderless conection which is used as an electrical connection is, of course, a resistance test. A good electrical connection of any kind must be capable of satisfactorily conducting current at all times and under various severe ambient conditions. Furthermore, any variations in the resistance of the connection caused by external influence must be so small that they compare favorably with soldered connections before engineers will be ready to accept such connections without solder.

There are two general types of tests which can be made on wrapped solderless connections according to the present invention, namely, mechanical tests and electrical tests. The mechanical tests provide an indication as to the mechanical strength of the connections in production, in handling and in exposure to various ambient external influences, such as vibrations. The electrical tests generally preferred in this field provide a comparison of resistance measurements before and after the connection under consideration has been exposed to various conditions of temperature, humidity, corrosive atmosphere, vibration, handling, etc.

Suggested mechanical tests are those which may be classified generally as destructive tests for the purpose of ascertaining how difficult it is or may be to mechanically destroy the connection. A wrapped connection can be detached from a terminal in at least two ways. It can be taken off by pulling at a free end of the wire, thereby unwrapping it from the terminal, or it can be striped bodily from the terminal lengthwise thereof. The amount of stripping force necessary to destroy a wrapped connection is a general measure of the tightness with which the coil grips the longitudinal elements of the terminal. The amount of minimum stripping force which one may dictate for a particular connection will depend, of course, upon the intended use of the connection and its intended useful life span. A rather severe minimum limitation in this respect would be to require a minimum stripping force of about 3000 grams for a wrapped connection involving a nickel-silver rectangular terminal of dimensions .014 inch by .066 inch having wrapped thereon seven turns of No. 24 copper wire (.020 inch diameter), this being what is considered as a typical solderless wrapped connection useful in telephone systems.

Another mechanical consideration which one may investigate is whether or not a wrapped connection when subjected to sustained vibrations is as good as, or better than, the usual soldered connection. Comparative tests have shown that when subjected to continuous vibrations the solderless wrapped connections exhibited a life of some 40 times that of comparable soldered connections. In these types of tests the connections were vibrated with an amplitude of $\frac{1}{32}$ of an inch at frequencies of from 10 to 55 cycles per second, the unwrapped skinner wire lengths being approximately 3 inches. After 50 hours of such vibrations the soldered connections began to break. The reason for this appears to be that in the soldered connections the wire breaks where it emerges from the solder because of the abrupt change in cross-section at this point with the attendant high localization of breaking stress. A wrapped solderless connection, such as the one shown in Fig. 17 of the drawing and as will be apparent by reference to the discussion of Fig. 9, exhibits a tapered stiffness throughout a good portion of each of the end turns. This tapered stiffness represents a tapered flexibility, thereby permitting the solderless wrapped connection to absorb considerably more vibration without breaking than can a comparable soldered connection.

Considerable experience has been gained over a great number of years with various types of pressure connections. One electrical test which has been used by telephone engineers for many years in connection with maintaining the electrical goodness of such pressure connections is represented by the following steps of test procedure:

1. Measure the electrical resistance of the connection while producing movement between the terminal and the connecting wire.

2. Subject the connection to low temperature in a cold chamber at 0° F. for two hours.

3. Bake the connection at 180° F. for two hours.

4. Expose the connection to moist hydrogen sulphide for 30 minutes.

5. Subject the connection to 90 percent humidity for 48 hours in a humidity chamber.

6. Vibrate the connection for approximately 50 hours at frequencies of from 10 to 55 cycles per second at an amplitude of $\frac{1}{32}$ of an inch.

7. Measure the resistance of the connection as in step 1 above and record any measurable resistance variation.

If the variation is less than .005 ohm, the connection is considered satisfactory.

A proposed test procedure which has been devised as a more applicable test for wrapped connections than the one above outlined is as follows:

1. Measure the variation in the electrical resistance of the connection while movement is produced between the wire and the terminal.
2. Subject the connection to low temperature at 0° F. for two hours.
3. *Subject the connection to high temperature for two hours.
4. Expose the connection to a gas which will discolor the non-gas-tight areas.
5. Measure the variation in the electrical resistance as in 1 above.
6. Unwrap the wire and estimate the life from the dimensions of the gas-tight areas where the rates of corrosion are known.

If the variation in the electrical resistance is less than .002 ohm, the connection is considered satisfactory.

As a substitute for step 6 above, the connection may be subjected to 90 per cent humidity at 85° F. for two years as a long-term test for those connections where the rates of corrosion are not known. The subjecting of the connection to the amount of high temperature indicated in item 3 above is considered to be sufficiently severe to insure that the stresses in the connection will be relaxed as much as they would be under normal usage in a typical telephone office installation for approximately 40 years. It is obvious that the temperatures, conditions, times, etc. of these tests may be varied according to the intended uses of these connections. It is further to be understood that these tests are merely illustrative of the indestructible nature of good wrapped connections. The tests suggested are in no way to be considered as limiting the scope of the invention or as the only tests which can or may be imposed by those skilled in the art.

In order to determine the degree of harm which would be done to solderless wrapped connections when exposed to still more extreme conditions, such experiments as the following have been made:

1. Samples of wrapped connections involving No. 24 copper wire on a rectangular nickel-silver terminal measuring 30 by 60 mils were placed in a metal tube in the presence of sulphur and were heated until they were red hot.
2. The same types of connections were submerged in mild acid (soldering acid) until the copper wire was partly eaten through.
3. Plain brass rectangular terminals of comparable dimensions were wrapped with No. 24 tinned copper wire and were first exposed to the previously-mentioned test procedure involving the seven steps and were then left for 13 months in an atmosphere of 90 per cent humidity. In none of these three tests was a resistance change noted.

The above-outlined three or four groups of tests indicate the indestructible mechanical nature of and the electrical goodness of wrapped connections made according to the present invention. The intimate nature of the electric current carrying contact areas, the rather high forces at play in the making of such a connection and the so-called elastic reserve, which is a measure of the force with which these intimate contact areas are pressed together, help to maintain the satisfactory mechanical and electrical condition of such a connection.

Wrapped connections, when made in accordance with the teachings in this specification, will embody the basic elements of a long life, satisfactory electrical connection which is of the solderless wrapped type. Such a connection eliminates the cost of tin and lead for solder, the cost of soldering tools and the necessity for skilled soldering personnel and, as a result of at least these three factors, greatly reduces the cost of electrical circuit and apparatus manufacture, installation and maintenance. Furthermore, solderless wrapped connections which require no solder, etc., allow the use of materials, such as aluminum, which cannot easily be soldered but which normally must be welded or brazed, etc.

Furthermore, the present invention has been found to be satisfactorily embodied in a connection involving wire having an enamel coating or other insulating coating such that it is unnecessary to remove this coating prior to making the connection. The great forces at play during the winding operation are sufficient to cut through the enamel or other insulating coating to create a metal-to-metal contact appearing substantially as good as though clean, bare wire had been used.

Such a connection, as is made according to the present invention, may be soldered, brazed, welded, etc. if desired. However, the present invention pertains to the mechanical aspects of the connection. In other words, the present invention is not intended to be limited by the implication that it must be a so-called solderless connection, irrespective of the fact that such a connection well illustrates the merits of the invention.

It is to be understood that the above-described arrangements are merely illustrative of the application of the principles of the invention. Numerous other arrangements may be devised by those skilled in the art without departing from the spirit and scope of the invention.

What is claimed is:

1. A wrapped electrical connection comprising a terminal including at least two longitudinal surfaces which meet at an abrupt edge, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

2. A wrapped electrical connection comprising a terminal including at least two longitudinal surfaces which meet at an abrupt edge, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and

---

* The various temperatures for typical materials are as follows:

| | |
|---|---|
| Copper | 173° C. |
| Iron | 129° C. |
| Aluminum | 201° C. |
| Brass | Approximately 175° C. |
| Nickel-silver | Approximately 175° C. | wire turns, the majority of the fibers of said turns being under high tension, said average tension being not less than about 10 per cent and not more than about 75 per cent of the tensile breaking force of said wire, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifest in an elastic torsional strain in said terminal as a result of said coil attempting to unwind from its stressed condition.

3. A wrapped electrical connection comprising a terminal including at least two longitudinal surfaces which meet at an abrupt edge, said edge being such that a round wire may be bent around said edge for an angle of wrap of at least about 60 degrees where the ratio of wire diameter to mean radius of curvature of said wire is about four-tenths or greater, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

4. A wrapped electrical connection comprising a terminal including at least two longitudinal surfaces which meet at an abrupt edge, said edge being such that a round wire may be bent around said edge for an angle of wrap of at least about 60 degrees where the ratio of wire diameter to mean radius of curvature of said wire is about four-tenths or greater, a tight coil of wire surrounding said terminal in at least two turns, and contact areas on wire and terminal between wire turns and terminal edge at said edge, the aggregate of such contact areas per connection being about 100 percent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said average tension being not less than about 10 per cent and not more than about 75 per cent of the tensile breaking force of said wire, said high tension producing a high contacting pressure between said turns and said terminal edge at said contact areas, said average contacting pressure being about 75 percent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

5. A wrapped electrical connection comprising a terminal including at least two longitudinal surfaces which meet at an abrupt edge, said edge being formed by surfaces which meet at an angle of about 150 degrees or less, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

6. A wrapped electrical connection comprising a terminal including at least two longitudinal surfaces which meet at an abrupt edge, said edge being formed by surfaces which meet at an angle of about 150 degrees or less, a tight coil of wire surrounding said terminal in at least two turns, and contact areas on wire and terminal between wire turns and terminal edge at said edge, the aggregrate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said average tension being not less than about 10 per cent and not more than about 75 per cent of the tensile breaking force of said wire, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

7. A wrapped electrical connection comprising a terminal including at least two flat longitudinal surfaces which meet at an abrupt edge, said edge being formed by surfaces which meet at an angle of about 150 degrees or less, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said high tension producing a high contracting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a resut of said coil attempting to unwind from its stressed condition.

8. A wrapped electrical connection comprising a terminal including at least two flat longitudinal surfaces which meet at an abrupt edge, said edge being formed by surfaces which meet at an angle of about 150 degrees or less, a tight coil of wire surrounding said terminal in at least two turns, and contact areas on wire and terminal between wire turns and terminal edge at said edge, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edge which comprise sheared, mating depressions in both terminal edge and wire turns, the majority of the fibers of said turns being under high tension, said average tension being not less than about 10 per cent and not more than about 75 per cent of the tensile breaking force of said wire, said high tension producing a high contacting pressure between said turns and said terminal edge at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

9. A wrapped electrical connection comprising a terminal having flat longitudinal surfaces, the cross-sectional shape of said terminal in the area surrounded by said wire being substantially a polygon of continuously convex perimeter having one or more edges of about 150 degrees or less, a tight coil of wire surrounding said terminal in at least two turns, and contact areas on wire and terminal between wire turns and terminal edges at said edges, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edges which comprise sheared, mating depressions in both terminal edges and wire turns, the majority of the fibers of said turns being under high tension, said high tension producing a high contacting pressure between said turns and said terminal edges at said contact areas, said average contacting pressure being about 75 per cent or greater of the yield stress of the wire or terminal material whichever material has the lower yield stress, said connecting having mechanically locked therein a potential of mechanical energy in the form of stresses locked in said turns and in said terminal, said potential energy being manifested in an elastic torsional strain in said terminal as a result of said coil attempting to unwind from its stressed condition.

10. A wrapped electrical connection comprising a terminal having flat longitudinal surfaces, the cross-sectional shape of said terminal in the area surrounded by said wire being substantailly a polygon of continuously convex perimeter having one or more edges of about 150 degrees or less, a tight coil of wire surrounding said terminal in at least two turns, and contact areas on wire and terminal between wire turns and terminal edges at said edges, the aggregate of such contact areas per connection being about 100 per cent or greater of the cross-sectional area of said wire, the contact area of said wire having a length-to-width ratio of not more than about 6 to 1, the contact area of said wire having a minimum linear dimension of its greatest width not less than about 1 mil, said contact areas of wire and terminal including portions thereof at the terminal edges which comprise sheared, mating depressions in both terminal edges and wire turns, the majority of the fibers of said turns being under high tension, said average tension being not less than about 10 per cent and not more than about 75 per cent of the tensile breaking force of said wire, said high tension producing a high contacting pressure between said turns and said terminal edges at said contact areas, said average contacting pressure being about 75 per cent or greater of the yield stress of the wire or terminal material whichever material has the lower yield stress, said connection having mechanically locked therein a potential of mechanical energy in the form of stresses locked in said turns and in said terminal, said potential energy being manifested in an elastic torsional strain in said terminal as a result of said coil attempting to unwind from its stressed condition.

References Cited in the file of this patent

UNITED STATES PATENTS

| | | |
|---|---|---|
| 356,902 | Thomson | Feb. 1, 1887 |
| 359,205 | Curtis, et al. | Mar. 7, 1887 |
| 1,668,016 | Hauschild | May 1, 1928 |
| 1,013,914 | Whitney | Jan. 9, 1912 |
| 1,830,084 | Bjorndal | Nov. 3, 1931 |
| 2,124,461 | Challet | July 19, 1938 |
| 2,214,151 | Wagar | Sept. 10, 1940 |
| 2,648,356 | Beaulieu et al. | Aug. 11, 1953 |